US008380142B2

(12) United States Patent
Ferreira

(10) Patent No.: US 8,380,142 B2

(45) Date of Patent: Feb. 19, 2013

(54) ELECTRONIC DEVICE INCLUDING A DUAL-FUNCTION DC-TO-DC CONVERTER

(75) Inventor: Edson Leocádio Ferreira, Peterborough (CA)

(73) Assignee: Siemens Aktiengesellschaft, München (DE)

( * ) Notice: Subject to any disclaimer, the term of this patent is extended or adjusted under 35 U.S.C. 154(b) by 655 days.

(21) Appl. No.: 12/286,673

(22) Filed: Oct. 1, 2008

(65) Prior Publication Data

US 2009/0117873 A1 May 7, 2009

(30) Foreign Application Priority Data

Oct. 1, 2007 (EP) .................................... 07019294

(51) Int. Cl.
*H04B 1/04* (2006.01)

(52) U.S. Cl. ......................................... 455/108; 330/10

(58) Field of Classification Search ........................ None
See application file for complete search history.

(56) References Cited

U.S. PATENT DOCUMENTS 4,184,197 A * 1/1980 Cuk et al. ........................ 363/16
4,639,714 A * 1/1987 Crowe .......................... 375/259
5,181,240 A * 1/1993 Sakuragi et al. ........... 379/93.36
5,416,387 A * 5/1995 Cuk et al. .................. 315/209 R
5,442,539 A * 8/1995 Cuk et al. ........................ 363/89
6,079,622 A * 6/2000 Goto ............................ 235/492
6,400,974 B1 * 6/2002 Lesho ........................... 600/347
6,434,220 B2 * 8/2002 Oi .................................. 379/24
6,664,770 B1 * 12/2003 Bartels .......................... 323/222
6,710,646 B1 * 3/2004 Kimball .......................... 330/10
6,809,678 B2 * 10/2004 Vera et al. ..................... 341/166
6,907,082 B1 6/2005 Loechner
6,972,584 B1 12/2005 Ferreira
6,980,783 B2 * 12/2005 Liu et al. ....................... 455/296
7,200,014 B1 * 4/2007 Hawkes et al. .............. 363/21.1
7,218,204 B2 * 5/2007 Hayashi ..................... 340/10.34
7,400,119 B1 * 7/2008 Stamps et al. ................ 323/266
7,439,800 B2 * 10/2008 Conraux ....................... 329/347
7,653,366 B2 * 1/2010 Grigore ...................... 455/127.1
7,844,410 B2 * 11/2010 Lalla .............................. 702/65
2004/0183550 A1 * 9/2004 Fehrenbach et al. .......... 324/662
2006/0039169 A1 * 2/2006 Chen et al. ...................... 363/17
2007/0285347 A1 * 12/2007 Karaki ............................ 345/30
2007/0286305 A1 * 12/2007 Saggini et al. ................ 375/272
2008/0013226 A1 * 1/2008 Kirst .............................. 361/18
2008/0174178 A1 * 7/2008 Jakobsson et al. .............. 307/31
2008/0311877 A1 * 12/2008 Darshan ........................ 455/402
2009/0224886 A1 * 9/2009 Rofougafan et al. ........ 340/10.1
2010/0019930 A1 * 1/2010 Biester et al. ................. 340/850
2010/0061733 A1 * 3/2010 Loechner ...................... 398/128
2010/0188064 A1 * 7/2010 Mansfield ..................... 323/299
2010/0277090 A1 * 11/2010 Fukumoto ..................... 315/291
2011/0031925 A1 * 2/2011 Simburger et al. ........... 320/101
2011/0060534 A1 * 3/2011 Karbula et al. ................. 702/30

FOREIGN PATENT DOCUMENTS

GB 2229897 A 10/1990

* cited by examiner

*Primary Examiner* — Thomas J Hiltunen

(57) ABSTRACT

An electronic device, e. g. a measuring transducer, has an interface circuit for communicating with and receiving power from a two-wire line, said interface circuit has a modulator connected to the two-wire line and responsive to an information signal for modulating the current in the two-wire line according to the information signal, and further has a controllable switching type DC-to-DC converter for extracting power for the electronic device from the two-wire line. To reduce energy losses, the DC-to-DC converter is designed to be controlled by said information signal and to perform the function of the modulation means.

3 Claims, 1 Drawing Sheet

ELECTRONIC DEVICE INCLUDING A DUAL-FUNCTION DC-TO-DC CONVERTER

CROSS REFERENCE TO RELATED APPLICATIONS

This application claims priority of European Patent Office application No. 07019294.3 EP filed Oct. 1, 2007, which is incorporated by reference herein in its entirety.

FIELD OF INVENTION

The present invention relates to an electronic device having an interface circuit for communicating with and receiving power from a two-wire line, said interface circuit comprising a modulation means connected to the two-wire line and responsive to an information signal for modulating the current in the two-wire line according to the information signal, and further comprising a controllable switching type DC-to-DC converter for extracting power for the electronic device from the two-wire line.

BACKGROUND OF INVENTION

Such an electronic device is known from U.S. Pat. No. 6,907,082, U.S. Pat. No. 6,972,584 or GB 2 229 897.

In the known devices, the modulation means comprises a variable resistor constituted by the collector-emitter path of a transistor. The transistor needs a minimum voltage drop across the collector-emitter path to properly work as a controllable current sink, and the current is controlled by adjusting this voltage drop which causes power dissipation.

SUMMARY OF INVENTION

It is therefore an object of the invention to reduce or completely eliminate such losses.

The object is achieved by the electronic device of the type initially mentioned in that the DC-to-DC converter is modified to be controlled by said information signal and to perform the function of the modulation means. That is, the current sink function is implemented in a switched mode fashion.

The modified DC-to-DC converter nearly losslessly converts the two-wire line voltage to a feeding voltage for the electronic device, where the control is changed from controlling the output voltage of the DC-to-DC converter to controlling its input current. In the changed control the input current is used as the feedback variable and therefore is controlled by the switching duty cycle of the modified DC-to-DC converter in that the output voltage is not regulated. The output voltage of the DC-to-DC converter should be limited by whatever value and method is more appropriated for the electronic device components being feed by the output voltage, such as a simple zener diode or a shunt regulator. As the modified DC-to-DC converter has only a current control loop and the usually present output capacitor is not part of the control loop, the restrictions of a conventionally used DC-to-DC converter to increase the bandwidth are removed. This allows for controlling and modulating the current in the two-wire line.

The modified DC-to-DC converter may be of any switched topology with or without features to minimize switching losses as using resonant circuits. Preferably, switching circuit topologies with inherent input inductor like a boost and Cuk converter are used, the advantage of which is that it creates a smooth current at input and allows higher bandwidth for controlling the input current.

The electronic device is typically a field device for process automation, such as a measuring transducer, but may also be any other device being powered and communicating over a two-wire line with a variety of communication protocols. Examples of communication protocols include analog 4 to 20 mA, HART, PROFIBUS PA and FOUNDATION Fieldbus.

BRIEF DESCRIPTION OF THE DRAWINGS

The invention will be now described by way of preferred examples and with reference to the accompanying drawing, in which.

DETAILED DESCRIPTION OF INVENTION

Figure 1:
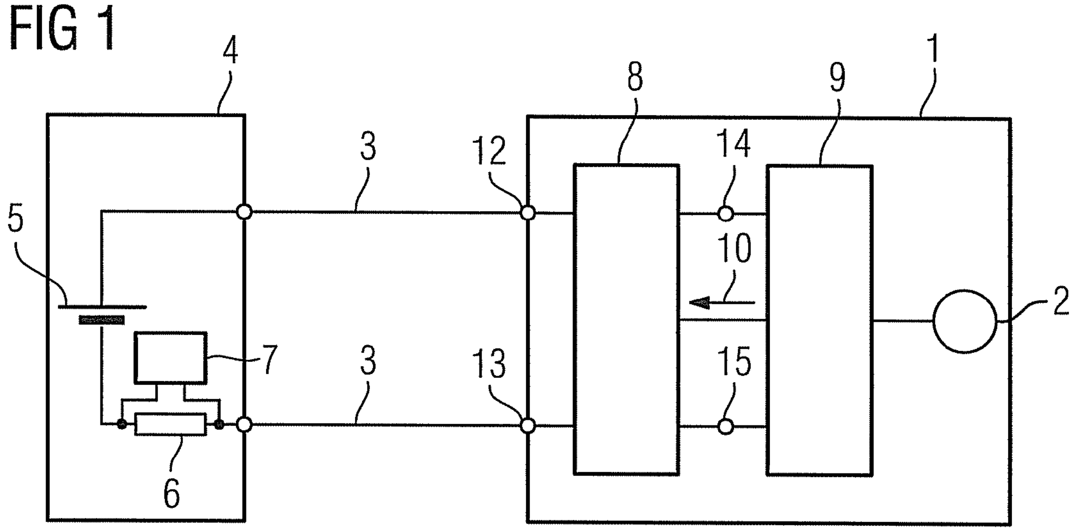
FIG. 1 shows a block diagram of a two-wire system including an electronic device according to the invention having an interface circuit for communicating over and receiving power from the two-wire system.

Reference is first made to FIG. 1 which exemplarily shows the basic components of a two-wire system including a DC-powered electronic device 1, here a measuring transducer for process automation, responsive to a process variable measured by a sensor 2. The electronic device 1 is linked by a two-wire line 3 to a remote receiving station 4 in which a DC power supply 5 is connected in series with a current sensing resistor 6. The voltage across the current sensing resistor 6 is applied to a receiver 7 which may be a process variable indicator, recorder, a controller and any other device appropriate to process control. The electronic device 1 comprises an interface circuit 8 providing an interface between the two-wire line 3 and remaining circuit components of the device 1. These components include in particular a microcontroller 9 which receives a signal from the sensor 2 and, after processing it to an information signal 10 representative of the value of the process variable, controls the interface circuit 8 to transmit this value onto the two-wire line 3. The circuit components including the microcontroller 9 are powered from the power supply 5 via the two-wire line 3 and the interface circuit 8.

Figure 2:
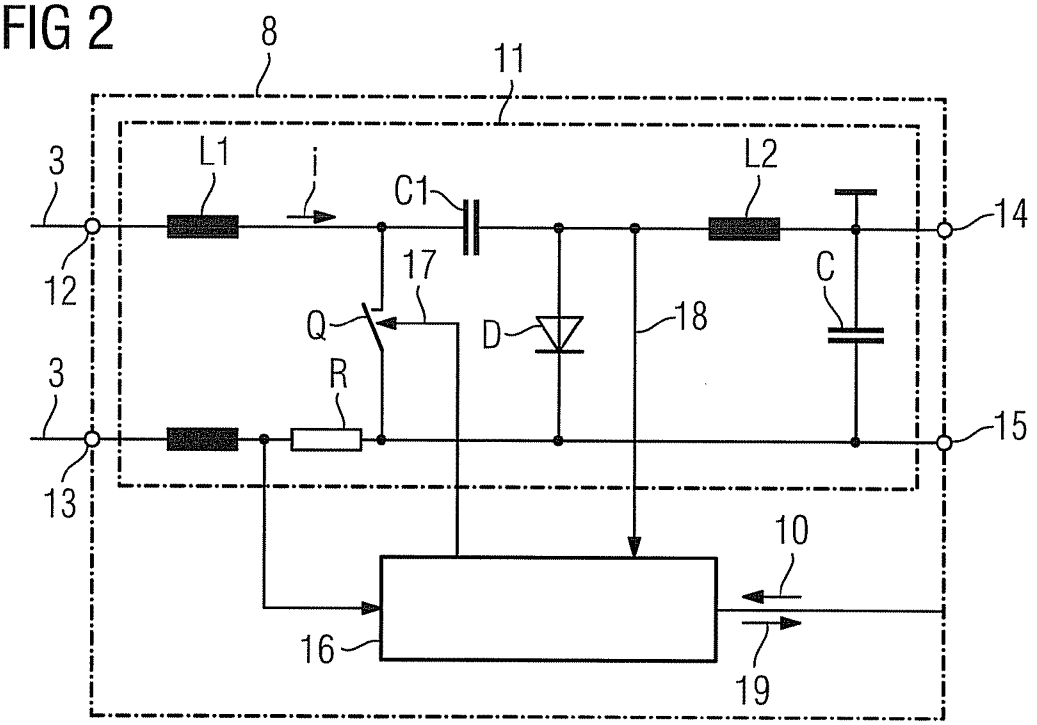
FIG. 2 shows a block diagram of the interface circuit.

FIG. 2 shows an embodiment of the interface circuit 8 which comprises a controllable switching type DC-to-DC converter 11 having input terminals 12, 13 coupled to the two-wire line 3 and output terminals 14, 15 coupled to the supply lines of the circuit components of the device 1. The DC-to-DC converter 11 serves the double purpose of supplying energy from the two-wire line 3 to the components of the device 1 and for transmitting the information signal 10 onto the two-wire line 3. A controller 16 generates a modulation signal 17 for modulating the current i on the two-wire line 3 in response to the information signal 10 and the actual current i measured by a current probe R. The DC-to-DC converter 11 is configured as a Cuk converter and includes an input inductor L1 connected to terminal 12, an output inductor L2 connected to terminal 14, an energy transfer capacitor C1 connected between the two inductors L1, L2 and two switches Q and D configured to alternately tie the inductors L1 or L2 to a common connection. Specifically, transistor switch Q is configured to be controlled by the modulation signal 17 and diode switch D is configured to switch ON and OFF in response to the switching of transistor Q. The function of a Cuk converter is well known and therefore does not require a particular specific description.

The remote station 4 may include additional means (not shown) for transmitting information such as parameters to the device 1 by modulating the voltage across the two-wire line 3.

The resulting voltage variations can be detected in the device 1 by line 18 and fed to the controller 16 for forwarding the received information 19 to the microcontroller 9.

The invention claimed is:

1. An electronic device, comprising:

a sensor configured to measure a variable;

an interface circuit for communicating with and receiving power from a remote receiving station through a two-wire line, wherein the interface circuit has a dual-function controllable switching type DC-to-DC converter connected to the two-wire line and responsive to an information signal indicative of the variable measured by the sensor, wherein the DC-to-DC converter is configured to modulate current in the two-wire line according to the information signal, extract power for the electronic device from the remote receiving station through the two-wire line, and communicate the information signal indicative of the variable measured by the sensor to the remote receiving station through the two-wire line.

2. The electronic device according to claim 1, wherein the DC-to-DC converter is a Cuk converter.

3. The electronic device according to claim 1, wherein the DC-to-DC converter is a boost converter.

* * * * *